US012615498B2

(12) United States Patent (10) Patent No.: US 12,615,498 B2

Köstermann et al. (45) Date of Patent: Apr. 28, 2026

(54) METHOD FOR EXCHANGING INFORMATION BETWEEN VEHICLES

(71) Applicant: Volkswagen Aktiengesellschaft, Wolfsburg (DE)

(72) Inventors: Janis Köstermann, Berlin (DE); Hendrik Hoppmann, Braunschweig (DE); Jörg Voltmer, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 41 days.

(21) Appl. No.: 18/721,851

(22) PCT Filed: Dec. 12, 2022

(86) PCT No.: PCT/EP2022/085436
§ 371 (c)(1),
(2) Date: Jun. 19, 2024

(87) PCT Pub. No.: WO2023/117550
PCT Pub. Date: Jun. 29, 2023

(65) Prior Publication Data
US 2025/0080961 A1 Mar. 6, 2025

(30) Foreign Application Priority Data

Dec. 23, 2021 (DE) .......................... 102021215029.2

(51) Int. Cl.
*H04W 4/46* (2018.01)
*H04L 51/04* (2022.01)
*H04W 4/12* (2009.01)

(52) U.S. Cl.
CPC ............... *H04W 4/46* (2018.02); *H04L 51/04* (2013.01); *H04W 4/12* (2013.01)

(58) Field of Classification Search
CPC ... G08G 1/096791; H04L 51/04; H04L 67/10; H04L 67/12; H04W 4/12; H04W 4/46
See application file for complete search history.

(56) References Cited

U.S. PATENT DOCUMENTS

| | | | | |
|---|---|---|---|---|
| 8,098,170 B1 * | 1/2012 | Szczerba | ................ | G02B 27/01 |
| | | | | 340/905 |
| 9,955,306 B1 * | 4/2018 | Barron | .................. | H04W 4/023 |
| 9,998,451 B2 * | 6/2018 | Menzel | ................ | H04L 63/083 |
| 11,525,882 B2 * | 12/2022 | Holzmann | .............. | H04W 4/46 |

(Continued)

FOREIGN PATENT DOCUMENTS

| | | |
|---|---|---|
| DE | 102004061782 A1 | 9/2005 |
| DE | 102011112276 A1 | 5/2012 |
| DE | 102011114810 A1 | 5/2012 |
| DE | 102016225746 A1 | 6/2018 |

(Continued)

OTHER PUBLICATIONS

PCT/EP2022/085436 International Search Report (Mar. 3, 2023). Priority DE Application No. 102021215029.2. Office Action (Dec. 23, 2022).

(Continued)

*Primary Examiner* — Christopher Biagini
(74) *Attorney, Agent, or Firm* — Peter Zura; LOZA & LOZA, LLP

(57) ABSTRACT

Technologies and techniques for communication between a plurality of vehicles enable intuitive communication without distracting the driver. The method involves receiving a message from a second vehicle by a first vehicle, where the message includes content and information regarding the second vehicle. The representation of the second vehicle is presented in a contact analog presentation within a display region of a display unit in the first vehicle, based on the received information regarding the second vehicle. The message content is then presented with reference to the (Continued)

representation of the second vehicle in the contact analog presentation. The system may utilize an on-board computer or a similar display unit for the presentation.

20 Claims, 2 Drawing Sheets

(56)                    References Cited

U.S. PATENT DOCUMENTS

| | | | | | |
|---|---|---|---|---|---|
| 2002/0102002 | A1* | 8/2002 | Gersabeck | .......... | B60R 16/0373 |
| | | | | | 381/86 |
| 2005/0197842 | A1* | 9/2005 | Bergmann | .............. | H04L 51/04 |
| | | | | | 704/270.1 |
| 2010/0184406 | A1* | 7/2010 | Schrader | ............. | H04M 1/6091 |
| | | | | | 704/235 |
| 2015/0381551 | A1* | 12/2015 | Cai | ......................... | H04L 51/10 |
| | | | | | 709/206 |

| | | | | | |
|---|---|---|---|---|---|
| 2016/0176372 | A1* | 6/2016 | Kim | ...................... | G06F 3/0482 |
| | | | | | 701/49 |
| 2020/0258306 | A1* | 8/2020 | Forutanpour | ......... | G01S 5/0072 |
| 2023/0322080 | A1* | 10/2023 | Liebau | ................... | B26D 1/305 |
| | | | | | 701/36 |

FOREIGN PATENT DOCUMENTS

| | | | |
|---|---|---|---|
| DE | 102017204450 | A1 | 9/2018 |
| DE | 102018116067 | A1 | 1/2020 |
| DE | 102018211258 | A1 | 1/2020 |
| DE | 102019105588 | A1 | 9/2020 |
| DE | 102019208204 | A1 | 12/2020 |
| DE | 102020124055 | A1 | 3/2022 |
| EP | 2514161 | B1 | 4/2016 |

OTHER PUBLICATIONS

European Standard Draft ETSI EN 302 890-2 V2.1.1 2020-03 Intelligent Transport Systems (ITS; Facilities Layer function; Part 2: Position and Time management (PoTi); Release 2.

* cited by examiner 18    12  14  16

20    10

METHOD FOR EXCHANGING INFORMATION BETWEEN VEHICLES

RELATED APPLICATIONS

The present application claims priority to International Patent Application No. PCT/EP2022/085436 to Köstermann et al., filed Dec. 12, 2022, titled "Method For Exchanging Information Between Vehicles," which claims priority to German Pat. App. No. DE 102021215029.2, filed Dec. 23, 2021, to Köstermann et al., the contents of each being incorporated by reference in their entirety herein.

TECHNICAL FIELD

The present disclosure relates to technologies and techniques for exchanging information between a first vehicle and a second vehicle. In addition, the present disclosure relates to a vehicle, in particular a motor vehicle, comprising at least one display unit having a display region, at least one communication interface, and at least one control unit.

The present disclosure furthermore relates to a computer program (product) for carrying out the method for exchanging information between multiple vehicles.

BACKGROUND

During a drive in a modern motor vehicle, situations frequently arise in which it is useful or desirable to communicate with other road users in the surroundings of the moving motor vehicle. There are countless scenarios in which the communication can both improve the driving experience and optimize logistical aspects of the drive. Warning messages are conceivable, which a road user would like to share with another or several other road users in the surroundings. This includes, for example, objects on the roadway, notices regarding cargo of a vehicle that the driver of the relevant vehicle possibly cannot monitor, or malfunctions of a preceding vehicle which are apparent from the outside, such as, for example, a failed light, inadequate tire pressure or the like. It is also conceivable that vehicles want to drive in a convoy and alert one another to the respective positions of the vehicles. It may also be useful that the preceding vehicle advises of upcoming exits, turns or the like.

Numerous options of how to establish communication between vehicles are known from the prior art. These include, in particular, indirect connections such as radio devices, telephone, messenger services, and combinations thereof. The drawback that results from this configuration is primarily that the driver has to utilize additional devices for the communication and can thus only partially still direct his or her attention to guiding the vehicle. In addition, telephone connections or the connection to mobile data networks are necessary to implement such communication.

One drawback of the aforementioned options for establishing communication between vehicles is that the driver of the vehicle is distracted by active "forced communication" that cannot be ignored.

SUMMARY

Aspects of the present disclosure are directed to providing technologies and techniques for exchanging information between multiple vehicles, a vehicle, and a computer program (product), in which communication can be implemented between multiple vehicles during which the driver of the vehicle is not distracted, but can intuitively communicate with other vehicles.

Some aspects of the present disclosure are provided in the subject matters of the independent claims, found below. Other aspects are disclosed in the subject matter of the respectively associated dependent claims, the description and the figures.

In some examples, a method is disclosed, comprising: receiving a message of the second vehicle by the first vehicle, wherein the message contains a message content and information regarding the second vehicle; presenting a representation of the second vehicle in a contact analog presentation in a display region, in particular a display, of a display unit, in particular an on-board computer, of the first vehicle, based on the received information regarding the second vehicle; and presenting the message content with reference to the representation of the second vehicle in the contact analog presentation.

In some examples, a vehicle is disclosed, in particular a motor vehicle, comprising at least one display unit having a display region, at least one communication interface, and at least one control unit. It is provided that the control unit is designed to carry out a method according to the invention.

The disclosure provided herein regarding the method also apply, mutatis mutandis, to the vehicle according to the present disclosure.

In some examples, the display region of the display unit of the vehicle is configured as a head-up display. In this way, the messages of the sending vehicle can be directly displayed in the field of view of the driver of the receiving vehicle without the driver having to avert his or her gaze from the road.

In some examples, a computer program (product) is disclosed, encompassing commands which, when the program is executed by a computer, prompt the computer to carry out any of the methods disclosed herein.

The above comments regarding the method and the vehicle according to the present disclosure also apply, mutatis mutandis, to the computer program (product), where applicable.

The various specific examples and embodiments described in the present application can advantageously be combined with one another, unless they are implemented differently in the individual case.

DESCRIPTION OF THE DRAWINGS

Aspects of the present disclosure are described hereafter in exemplary embodiments based on the associated drawings. In the drawings.

DETAILED DESCRIPTION

Figure 1:
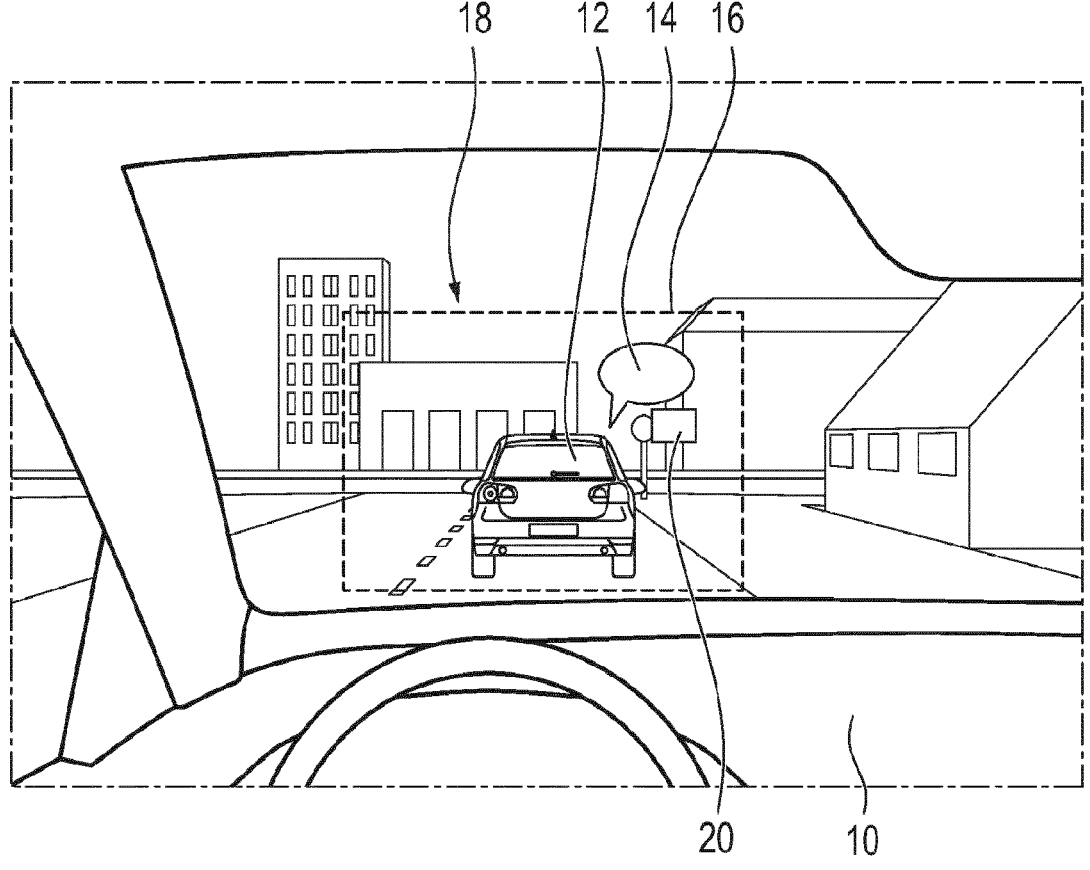
FIG. 1 schematically shows the presentation of a message in a display region of a display unit of a vehicle, which according to one exemplary embodiment of a method is presented for exchanging information between multiple vehicles, according to some aspects of the present disclosure.

In the examples disclosed herein, one advantage of the vehicle communication is the option to send and receive messages without distraction. Unlike telephone calls, the present method allows for spontaneous and timely dispatch of messages. Recipients who are driving do not need to actively respond to incoming messages and generally have the message content presented in a noticeable manner without being distracting. This method utilizes existing vehicle communication systems, eliminating the need for additional devices such as radio transmitters.

In some examples, the transmission of messages may be carried out via Car2C transmission. Car2X data involves technology where vehicles communicate with their surroundings, termed "X." In a special Car2Car variant of Car2X systems, vehicles can communicate with each other. Transmission is possible in both directions with Car2X, allowing communication between the vehicle and its surroundings. During communication, sensor data are preferably transmitted. In some examples, Car2X communication is implemented via a WLAN connection.

Due to the contact analog presentation, the driver of the first vehicle can intuitively determine from which second vehicle the message was sent, without being distracted, as the message presentation adapts to the actual traffic situation ahead of the first vehicle.

A contact analog presentation refers to display elements integrated into the driver's current view, perceived as part of the surroundings. These elements can be presented via an augmented reality display device, such as a display in the center or cockpit region, for example, in the instrument cluster. Alternatively, the display region can be designed as a head-up display, projecting information into the driver's field of vision, such as onto the windshield.

The representation of the second vehicle may be a direct presentation of the second vehicle itself, possibly shown via a camera image or as a virtual element in the display region. In some examples, a virtual element may overlay the camera image or, in the case of a head-up display, appear over the sending vehicle.

The display region may be a display inside the vehicle, connected to a display unit that transmits image contents. In some examples, the display unit may be an on-board computer, infotainment system, or navigation system.

For contact analog presentation, information about the second vehicle is needed to present it correctly in perspective. This information allows determination of three-dimensional coordinates for locating the second vehicle as a virtual element in the three-dimensional space displayed by the unit. The virtual element is then transformed into a two-dimensional image and correctly positioned in the driver's field of view.

The necessary information to calculate coordinates may come from various data sources, preferably vehicle or navigation data recorded by the vehicle's positioning sensor system, such as GPS, rotation rate sensors, or cameras.

Moreover, information about the second vehicle is transmitted to allow for its unambiguous identification. This information might include type, brand, model, color, or similar properties, or license plate data.

The message content involves notes exchanged between occupants of the first and second vehicles. These notes can also be presented in a contact analog manner in the display region. In some examples, messages are displayed in the driver's field of view and/or vehicle display without distraction. According to the present disclosure, the message content is displayed contact analog in the area where the second vehicle is presented. This presentation may include a word balloon, intuitively associating the message with the sending vehicle.

Further preferred embodiments of the present disclosure are derived from the features described in the dependent claims.

In a first embodiment, the method includes detecting voice input in the first vehicle, converting it to text via voice recognition, and transmitting a response message from the first to the second vehicle. This response message includes the text input and vehicle information. This simplifies message input, minimizing potential distraction. It may be provided that any spoken text is detected and emitted as a message. In some examples, message detection can start and/or end with a spoken command ("wake-up phrase"). Preferably, the message received from the second vehicle is also generated via speech to text from voice input detected from an occupant of the second vehicle.

In another advantageous embodiment, the display region is formed by a head-up display, which directly displays messages in the driver's field of view, minimizing distraction. Such displays project images onto the windshield via an imaging unit integrated into the dashboard. The driver perceives this as a virtual display in their field of vision. The area into which the light is reflected, termed the "eyebox," must align with the driver's field of view for them to perceive the virtual image.

For improved message identification, it is provided that voice input for response messages is assigned to an occupant of the first vehicle. This assignment allows clear distinction of message origin and can be visualized in the contact analog presentation for clarity. The first vehicle in this method acts as both a message recipient and sender. Similarly, messages received from the second vehicle are preferably assigned to its occupants, with this assignment visualized when presented in the first vehicle.

Additionally, in some examples, assignment is based on the occupant's voice, efficiently linking messages to specific occupants. Preferably, the response message includes occupant information, such as a person index. Messages from the second vehicle may also include occupant information, presented with the message content to clarify the sender.

To filter disruptive messages, it is provided that only voice inputs from predetermined occupants, preferably at least one predetermined voice, are converted to text and/or transmitted. This allows the driver to pre-select which messages to receive, filtering out background noise such as children's chatter during a family trip.

In another embodiment, messages are only received from predetermined second vehicles and/or at least one second vehicle is selected for response message transmission via voice or haptic input. This minimizes distraction by allowing the driver to set filters for incoming messages, ensuring only relevant messages are transmitted or received.

Before starting a drive, recipient circles for messages can be determined. Messages can be encrypted for security. Recipients can be added during the drive, and messages can be sent to individual recipients, groups (multicast), or all recipients (broadcast). Displayed messages are filtered based on recipient settings. If a message meets display criteria, it is shown directly in the display region, assigned to the sender visually, such as a word balloon over the emitting vehicle in an augmented reality head-up display.

In emergencies, certain messages may be received regardless of settings, such as a message indicating "I need a physician." An emergency in the second vehicle may trigger an automatic eCall and priority text message. The sender's name or an abbreviated designation can accompany the message, allowing the recipient to select messages by voice command for reading or response.

FIG. 1 shows a schematic illustration of a method for exchanging information between a first vehicle 10 and a second vehicle 12, For this purpose, a message having a message content 14 is emitted from the second vehicle 12 to the first vehicle 10. The message content 14 is presented in the display region 16 of a display unit 18. In the present exemplary embodiment, the display region 16 of the display unit 18 is a head-up display.

In a head-up display, the virtual display is created by an imaging unit that is integrated into the dashboard, such as, for example, a TFT display which is not shown here. This image is guided via several mirrors in the direction of the windshield, where the light is reflected into the eye of the driver. The driver perceives this image as a virtual display in the field of vision. When such systems are designed, the area into which the light is reflected is spatially delimited so as to achieve higher brightness as a result of less light scattering. This area is referred to as "eyebox" since the field of view of the driver must be in this area to allow him or her to perceive the virtual image.

Virtual elements that are presented in a contact analog manner in the display region 16 of the head-up display, that is, in the correct perspective for the driver, thus appear to the driver as if they were part of the surroundings. The message content 14 that is emitted by the second vehicle 12 and presented in the display region 16 of the display unit 18 is presented as a word balloon over the presented second vehicle 12. In this way, an assignment of the message content 14 can take place intuitively. The driver of the first vehicle 10 consequently sees directly, without being distracted, that the preceding second vehicle 12 has emitted a message.

The message content 14 may be detected via voice input. The voice input may be converted into a text message by means of voice recognition. In this way, the input of the message can be significantly simplified so that a potential risk of the driver of the second vehicle 12 being distracted is minimized. In some examples, a push-to-talk function is provided. For this purpose, the driver of the second vehicle 12 pushes a button to start the voice input. The message is converted into a text message by way of voice recognition and can then be displayed in the first vehicle 10. In this way, only messages that are in fact to be transmitted are recorded and transmitted. The button is located at the steering wheel of the vehicle so that the driver of the second vehicle 12 is not distracted when entering the message 10 and can continue to keep both hands on the steering wheel.

During the voice recognition, additionally the voice of the relevant person is recognized. The voice is then furthermore assigned to the corresponding person and provided with an index 20. The index 20 is presented in the area of the message content 14 when the message content 14 is being displayed in the display region 16 of the display unit 18 so that it is made clear to the occupants or the driver of the first vehicle 10 from whom the present message stems. In addition, it is provided that a filter can be used, by way of which it is already determined prior to starting to drive which voice is received and which is to be filtered out.

Figure 2:
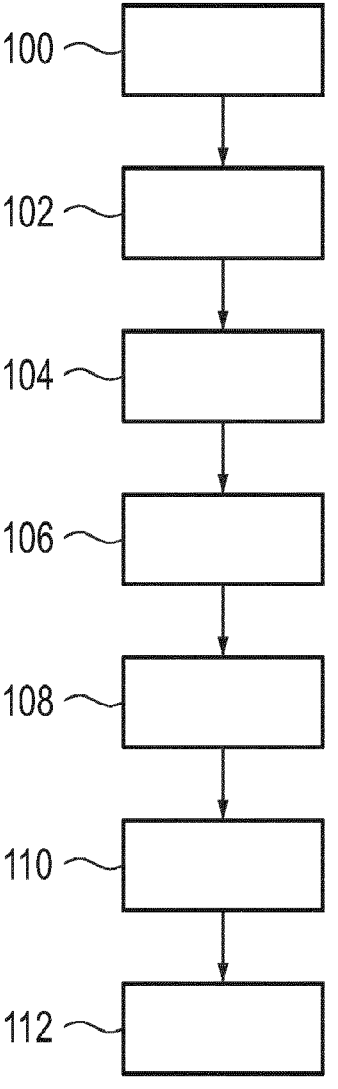
FIG. 2 shows a schematic illustration of the different steps of a method for exchanging information between multiple vehicles, according to some aspects of the present disclosure.

FIG. 2 shows a schematic illustration of the different steps of an exemplary embodiment of the method for exchanging information between two vehicles. A message application may be implemented in the vehicle within the cockpit electronics. In a first step 100, recipients (individual, group, all, and so forth) can be selected as a setting. In step 102, messages are input via a voice command or the operation of a key, for example push to talk. The user speaks his or her message, which is then converted into text by the application in step 104 and is sent to the preset recipient group in step 106. The transmission of the message is carried out by way of Car2X via WLANp or in a mobile radio-based manner, depending on which communication is presently available. The messages can optionally be encrypted and corresponding key material can be exchanged with the desired recipients.

The content of the message, in text form, may be supplemented in step 108 with information regarding the emitting vehicle (position, identifier, vehicle data, license plate, and so forth). On the recipient side, an incoming message is checked for relevance in step 110 and compared to the presettings (are messages to be displayed at all, filter settings, and so forth). If the message is to be displayed, this is preferably carried out in step 112 in the head-up display. The content of the message is assigned to the emitting vehicle in the field of vision and presented over the same in the form of a word balloon.

LIST OF REFERENCE NUMERALS

10 first vehicle
12 second vehicle
14 message content
16 display region
18 display unit
20 index

The invention claimed is:

1. A method for exchanging information between a first vehicle and a second vehicle, the method comprising:
   receiving, by the first vehicle, a message indicating origination from the second vehicle, the message comprising message content and information regarding the second vehicle;
   presenting a representation of the second vehicle in a contact analog presentation in a display region of a display unit of the first vehicle, based on the received information regarding the second vehicle; and
   presenting the message content as being associated with the representation of the second vehicle in the contact analog presentation.

2. The method of claim 1, further comprising:
   detecting a voice input in the first vehicle;
   converting the voice input into text input by means of voice recognition; and
   transmitting a response message from the first vehicle to the second vehicle, the response message including the text input as the message content and information regarding the first vehicle.

3. The method of claim 2, further comprising assigning the voice input to an occupant of the first vehicle.

4. The method of claim 3, wherein the assignment is carried out based on the voice of the occupant and the response message further comprises information regarding the occupant.

5. The method of claim 3, wherein only voice inputs of at least one predetermined occupant are converted into text input and/or transmitted to the second vehicle.

6. The method of claim 1, wherein the display region of the display unit comprises a head-up display.

7. The method of claim 1, further comprising:
   receiving messages only from a predetermined set of second vehicles; and/or
   selecting at least one second vehicle as the recipient of a response message via voice input or haptic input.

8. A vehicle, comprising:

at least one display unit including a display region;

at least one communication interface; and at least one control unit comprising at least one processor operatively coupled to the display unit and the communication interface, the at least one control unit being configured to:

receive, by the vehicle, a message indicating origination from a second vehicle, the message comprising message content and information regarding the second vehicle;

present a representation of the second vehicle in a contact analog presentation in the display region based on the received information regarding the second vehicle;

present the message content as being associated with the representation of the second vehicle in the contact analog presentation.

9. The vehicle of claim 8, wherein the control unit is further configured to:

detect a voice input in the vehicle;

convert the voice input into text input by means of voice recognition; and transmit a response message from the vehicle to the second vehicle, the response message including the text input as the message content and information regarding the vehicle.

10. The vehicle of claim 9, wherein the control unit is further configured to assign the voice input to an occupant of the vehicle.

11. The vehicle of claim 10, wherein the assignment is carried out based on the voice of the occupant and the response message further comprises information regarding the occupant.

12. The vehicle of claim 10, wherein the control unit is configured to convert into text input and/or transmit to the second vehicle only the voice inputs of at least one predetermined occupant.

13. The vehicle of claim 8, wherein the display region of the display unit comprises a head-up display.

14. The vehicle of claim 8, wherein the control unit is further configured to:

receive messages only from a predetermined set of second vehicles; and/or select at least one second vehicle as the recipient of a response message via voice input or haptic input.

15. A vehicle, comprising:

at least one display unit including a display region;

at least one communication interface; and at least one control unit comprising at least one processor operatively coupled to the display unit and the communication interface, the at least one control unit being configured to:

receive, by the vehicle, a message indicating origination from a second vehicle, the message comprising message content and information regarding the second vehicle;

present a representation of the second vehicle in a contact analog presentation in the display region based on the received information regarding the second vehicle;

present the message content as being associated with the representation of the second vehicle in the contact analog presentation;

detect and process sensor data to enhance the accuracy of the contact analog presentation; and integrate with a vehicle system to display the message content and vehicle representation.

16. The vehicle of claim 15, wherein the control unit is further configured to:

detect a voice input in the vehicle;

convert the voice input into text input by means of voice recognition; and transmit a response message from the vehicle to the second vehicle, the response message including the text input as the message content and information regarding the vehicle.

17. The vehicle of claim 16, wherein the control unit is further configured to assign the voice input to an occupant of the vehicle.

18. The vehicle of claim 17, wherein the assignment is carried out based on the voice of the occupant and the response message further comprises information regarding the occupant.

19. The vehicle of claim 17, wherein only voice inputs of at least one predetermined occupant are converted into text input and/or transmitted to the second vehicle.

20. The vehicle of claim 15, wherein the display region of the display unit comprises a head-up display.

* * * * *